US010782071B2

(12) United States Patent
Cerny et al.

(10) Patent No.: US 10,782,071 B2
(45) Date of Patent: Sep. 22, 2020

(54) TUBULAR ARRAY HEAT EXCHANGER

(71) Applicant: General Electric Company, Schenectady, NY (US)

(72) Inventors: Matthew Robert Cerny, West Chester, OH (US); Nicholas Allan Wilson, Cincinnati, OH (US); Nicholas Taylor Moore, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/471,356

(22) Filed: Mar. 28, 2017

(65) Prior Publication Data

US 2018/0283794 A1    Oct. 4, 2018

(51) Int. Cl.
| | |
|---|---|
| *F28F 9/00* | (2006.01) |
| *F28D 1/047* | (2006.01) |
| *F28D 7/02* | (2006.01) |
| *F28F 9/02* | (2006.01) |
| *B33Y 10/00* | (2015.01) |
| *B33Y 30/00* | (2015.01) |

(Continued)

(52) U.S. Cl.
CPC ............ *F28D 1/0472* (2013.01); *B23P 15/26* (2013.01); *B33Y 10/00* (2014.12); *B33Y 30/00* (2014.12); *B33Y 80/00* (2014.12); *F28D 7/024* (2013.01); *F28F 9/02* (2013.01); *F28F 9/0268* (2013.01)

(58) Field of Classification Search
CPC ........ F28F 9/026; F28F 9/0263; F28F 9/0282; F28F 9/0265; F28F 2009/029; F28F 9/0268; F28F 9/0256; F28D 1/0472; F28D 7/16; F28D 7/02; F28D 7/022; F28D 7/024; F28D 7/04; B23P 15/26; B33Y 10/00; B33Y 30/00; B33Y 80/00
See application file for complete search history.

(56) References Cited

U.S. PATENT DOCUMENTS

| | | | |
|---|---|---|---|
| 3,496,997 A | 2/1970 | Weber | |
| 4,513,601 A * | 4/1985 | Herbulot | B21D 15/02 138/116 |

(Continued)

FOREIGN PATENT DOCUMENTS

EP    2 910 887 A1    8/2015

OTHER PUBLICATIONS

International Search Report and Written Opinion issued in connection with corresponding PCT Application No. PCT/US2017/067624 dated Apr. 26, 2018.

(Continued)

*Primary Examiner* — Travis C Ruby
*Assistant Examiner* — Harry E Arant
(74) *Attorney, Agent, or Firm* — Dority & Manning, P.A.

(57) ABSTRACT

A tubular array heat exchanger and a method of manufacturing the same are provided. The heat exchanger includes a plurality of tubes extending between a tube inlet and a tube outlet. An inlet manifold includes an inner wall and an outer wall defining an inlet plenum and one or more baffles extending between the inner wall and the outer wall to divide the inlet plenum into a plurality of fluid passageways, each of the plurality of fluid passageways extending between the inlet plenum and a respective one of the tube inlets. The tubes, the inlet manifold, and an outlet manifold identical to the inlet manifold are manufactured as a single monolithic component.

13 Claims, 11 Drawing Sheets

(51) Int. Cl.
    *B33Y 80/00*     (2015.01)
    *B23P 15/26*     (2006.01)

(56) References Cited

U.S. PATENT DOCUMENTS

| | | | |
|---|---|---|---|
| 4,573,526 A * | 3/1986 | Jung | F28F 9/0268 |
| | | | 165/134.1 |
| 4,785,877 A * | 11/1988 | Shen-Tu | C10G 9/002 |
| | | | 165/134.1 |
| 6,957,695 B2 | 10/2005 | Lomax, Jr. et al. | |
| 8,240,358 B2 | 8/2012 | Lomax et al. | |
| 9,200,855 B2 | 12/2015 | Kington et al. | |
| 10,094,619 B2 * | 10/2018 | Holiday | F28F 9/22 |
| 2002/0170556 A1 | 11/2002 | Gaitini | |
| 2002/0185011 A1 | 12/2002 | Koch et al. | |
| 2005/0067153 A1* | 3/2005 | Wu | F28D 7/16 |
| | | | 165/158 |
| 2009/0321045 A1 | 12/2009 | Hernon et al. | |
| 2015/0101334 A1 | 4/2015 | Bond et al. | |
| 2015/0377135 A1 | 12/2015 | Kupiszewski | |
| 2016/0003552 A1 | 1/2016 | Chordia et al. | |
| 2016/0138736 A1 | 3/2016 | Fleischer et al. | |
| 2016/0116219 A1 | 4/2016 | Seeholzer et al. | |
| 2016/0202003 A1 | 7/2016 | Gerstler et al. | |
| 2016/0281532 A1 | 9/2016 | Rambo et al. | |
| 2017/0030651 A1 | 2/2017 | Rock, Jr. et al. | |

OTHER PUBLICATIONS

Cerny, M.R., A tubular array heat exchanger, GE co-pending U.S. Appl. No. 15/471,314, filed Mar. 28, 2017.

* cited by examiner

TUBULAR ARRAY HEAT EXCHANGER

FEDERAL RESEARCH STATEMENT

This invention was made with Government support under Contract No. FA8650-15-D-2501, awarded by the U.S. Department of Defense. The Government has certain rights in the invention.

FIELD

The present subject matter relates generally to heat exchangers, and more particularly, to additively manufactured heat exchangers with improved heat transfer capability and structural rigidity.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bar, foils, fins, manifolds, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanging fluid passageways and features included therein.

Accordingly, a gas turbine engine with an improved heat exchanger would be useful. More specifically, a heat exchanger for a gas turbine engine that is easier to manufacture and includes features for improved thermal and structural performance would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a heat exchanger is provided. The heat exchanger defines a centerline and a radial direction perpendicular to the centerline. The heat exchanger includes an inlet manifold comprising an inner wall and an outer wall, the inner wall and the outer wall defining an inlet plenum. One or more baffles extend between the inner wall and the outer wall substantially along the radial direction to divide the inlet plenum into a plurality of fluid passageways spaced apart along the circumferential direction.

In another exemplary aspect of the present disclosure, an inlet manifold for a heat exchanger is provided. The inlet manifold includes an inner wall and an outer wall defining an inlet plenum. One or more baffles extend between the inner wall and the outer wall substantially along the radial direction to divide the inlet plenum into a plurality of fluid passageways.

In still another exemplary aspect of the present disclosure, a method of manufacturing a heat exchanger is provided. The method includes depositing a layer of additive material on a bed of an additive manufacturing machine and directing energy from an energy source onto the layer of additive material to fuse a portion of the additive material and form an inlet manifold. The inlet manifold includes an inner wall and an outer wall defining an inlet plenum and one or more baffles extending substantially along a radial direction between the inner wall and the outer wall to divide the inlet plenum into a plurality of fluid passageways.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
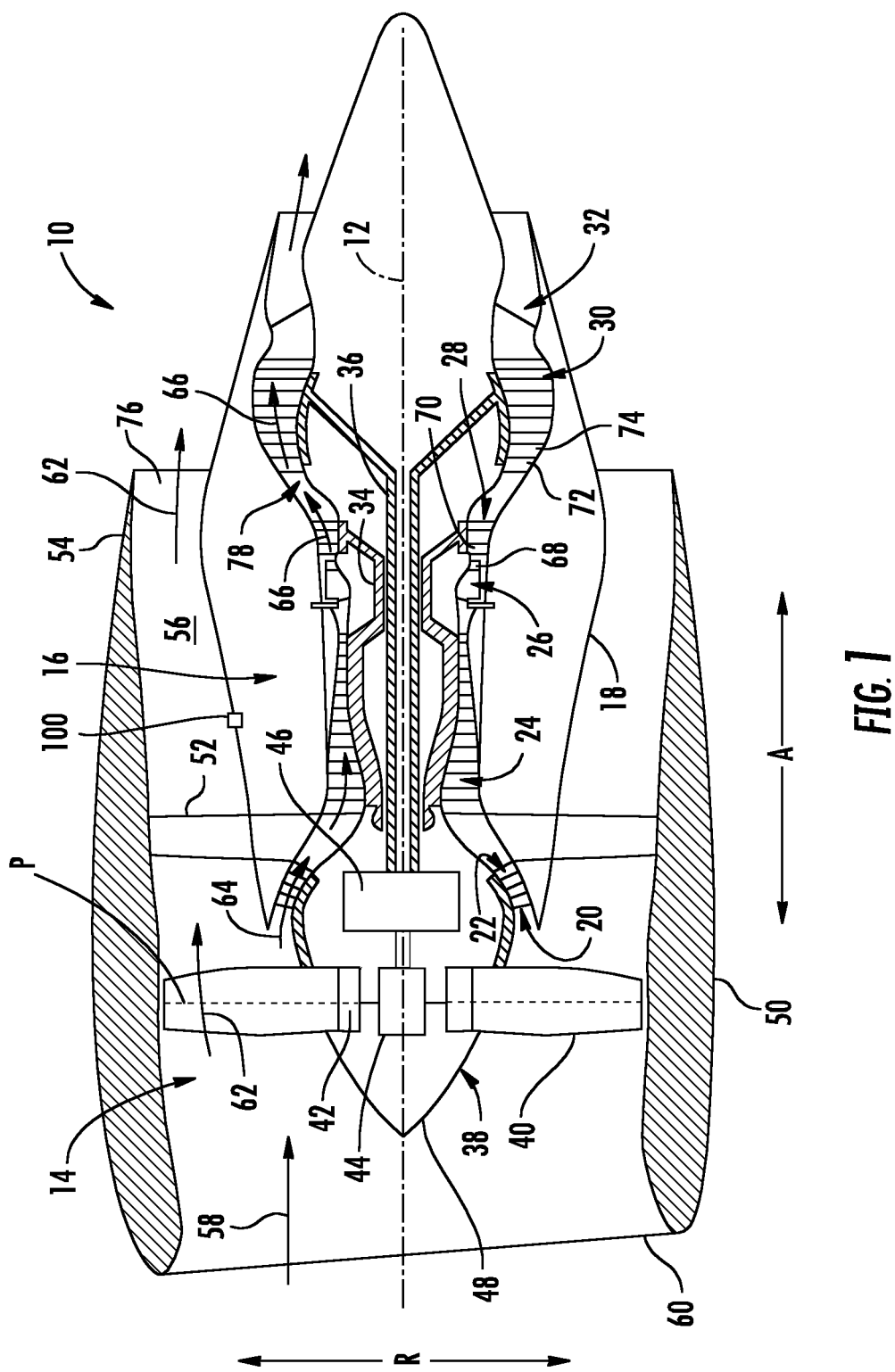
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The present disclosure is generally directed to an additively manufactured tubular array heat exchanger and a method of manufacturing the same. The heat exchanger includes a plurality of tubes extending between a tube inlet and a tube outlet. An inlet manifold includes an inner wall and an outer wall defining an inlet plenum and one or more baffles extending between the inner wall and the outer wall to divide the inlet plenum into a plurality of fluid passageways, each of the plurality of fluid passageways extending between the inlet plenum and a respective one of the tube inlets. The tubes, the inlet manifold, and an outlet manifold identical to the inlet manifold are additively manufactured as a single monolithic component.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may include one or more heat exchangers 100. Heat exchanger 100 may be used to transfer heat between two or more fluids in any suitable application. For example, as discussed below, heat exchanger 100 is configured for transferring heat from oil to air in a gas turbine engine. More specifically, heat exchanger 100 is illustrated as being positioned within bypass airflow passage 56 for allowing heat transfer between oil passing through heat exchanger 100 and air passing through bypass airflow passage 56.

However, it should be appreciated that heat exchanger 100 can be configured for receiving any suitable number and type of fluids for use in a heat transfer process, examples of which are described herein. Moreover, heat exchanger 100 may be placed at any other suitable location within turbofan 10 for harnessing fluid temperature differentials for heat transfer. Although the description below refers to the construction of heat exchanger 100, it should be appreciated that heat exchanger 100 is used only for the purpose of explaining aspects of the present subject matter. Indeed, aspects of the present subject matter may be applied to form heat exchangers used in automotive, aviation, maritime, and other industries to assist in heat transfer between fluids.

In general, the exemplary embodiments of heat exchanger 100 described herein may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, or as any suitable number of sub-components. In particular, the manufacturing process may allow heat exchanger 100 to be integrally formed and include a variety of features not possible when using prior manufacturing methods. For example, the additive manufacturing methods described herein enable the manufacture of heat exchangers having various features, configurations, thicknesses, materials, densities, and fluid passageways not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and fluid passageways having unique sizes, shapes, and orientations. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Figure 2:
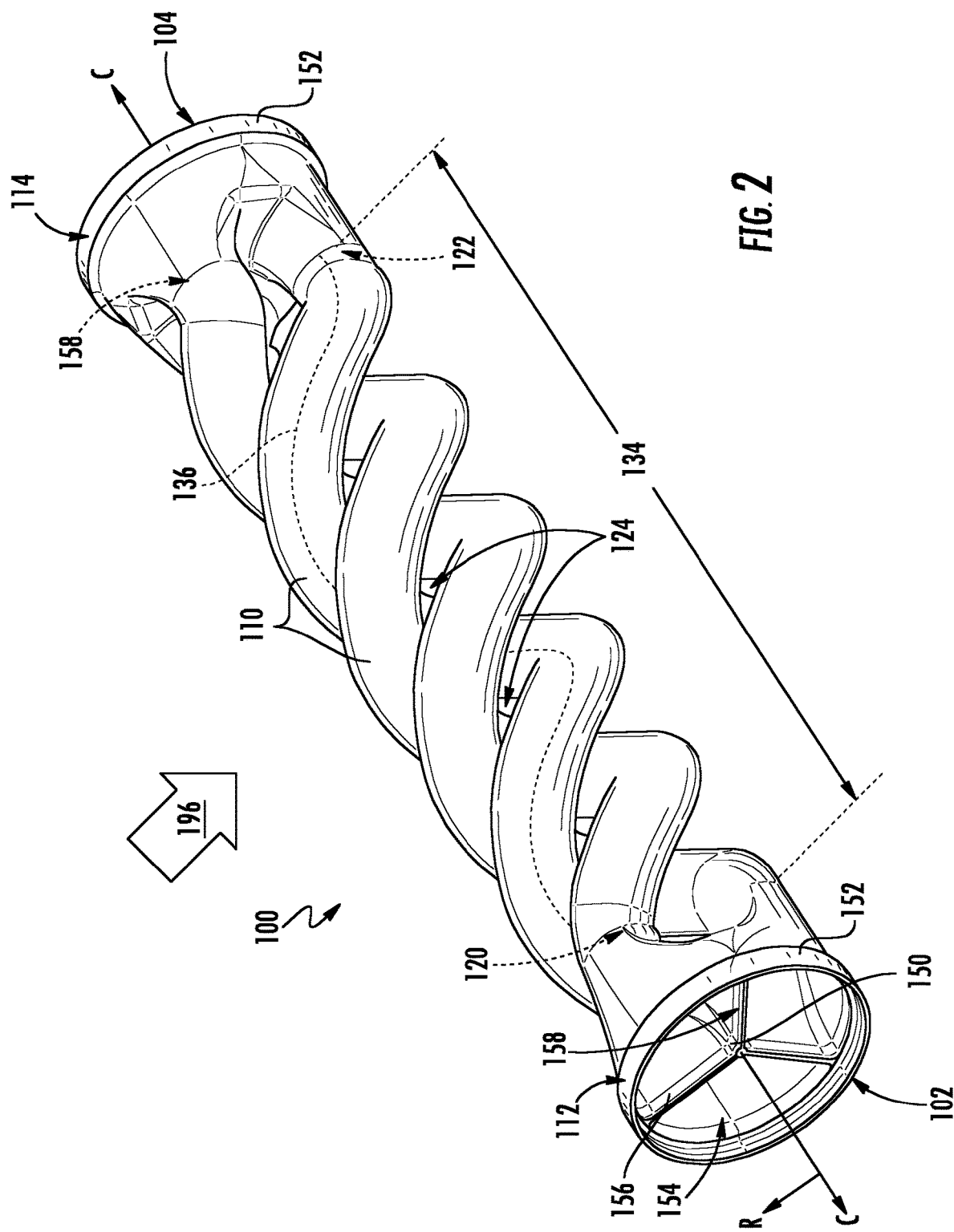
FIG. 2 provides a perspective view of an additively manufactured heat exchanger that may be used in the exemplary gas turbine engine of FIG. 1 according to an exemplary embodiment of the present subject matter.
Figure 3:
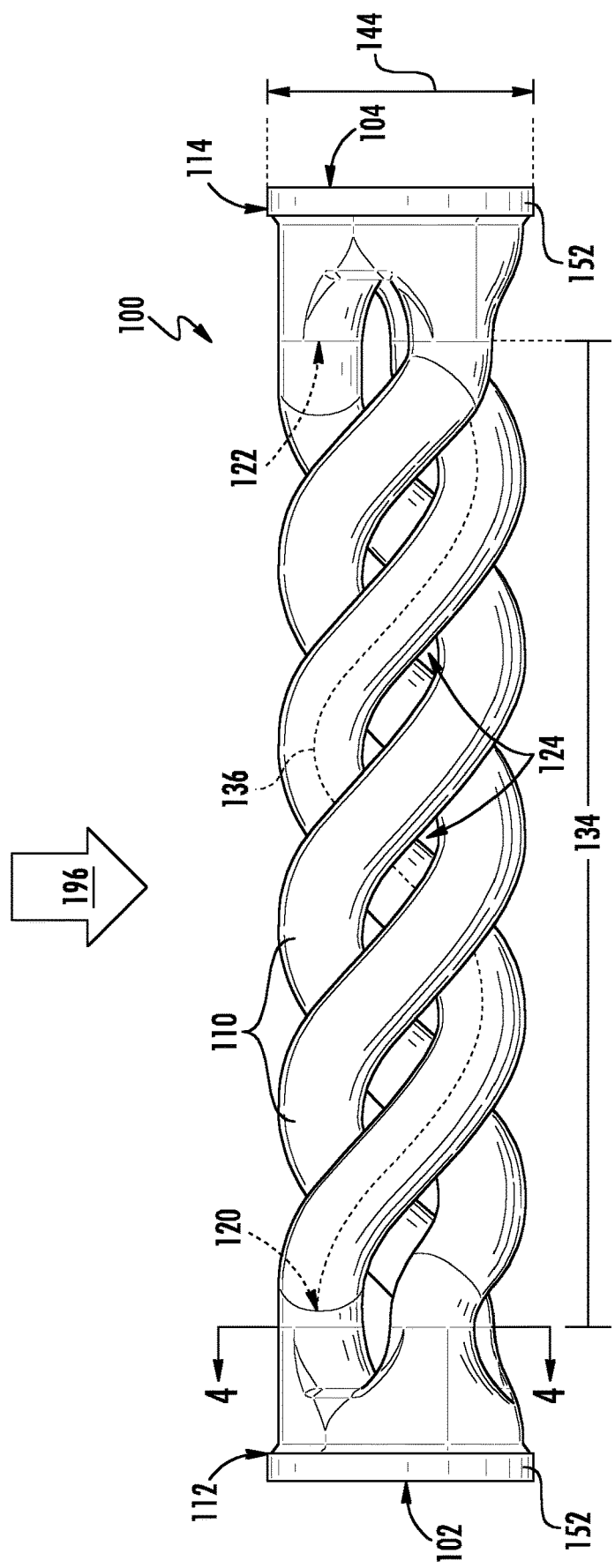
FIG. 3 provides a side view of the exemplary heat exchanger of FIG. 2.
Figure 4:
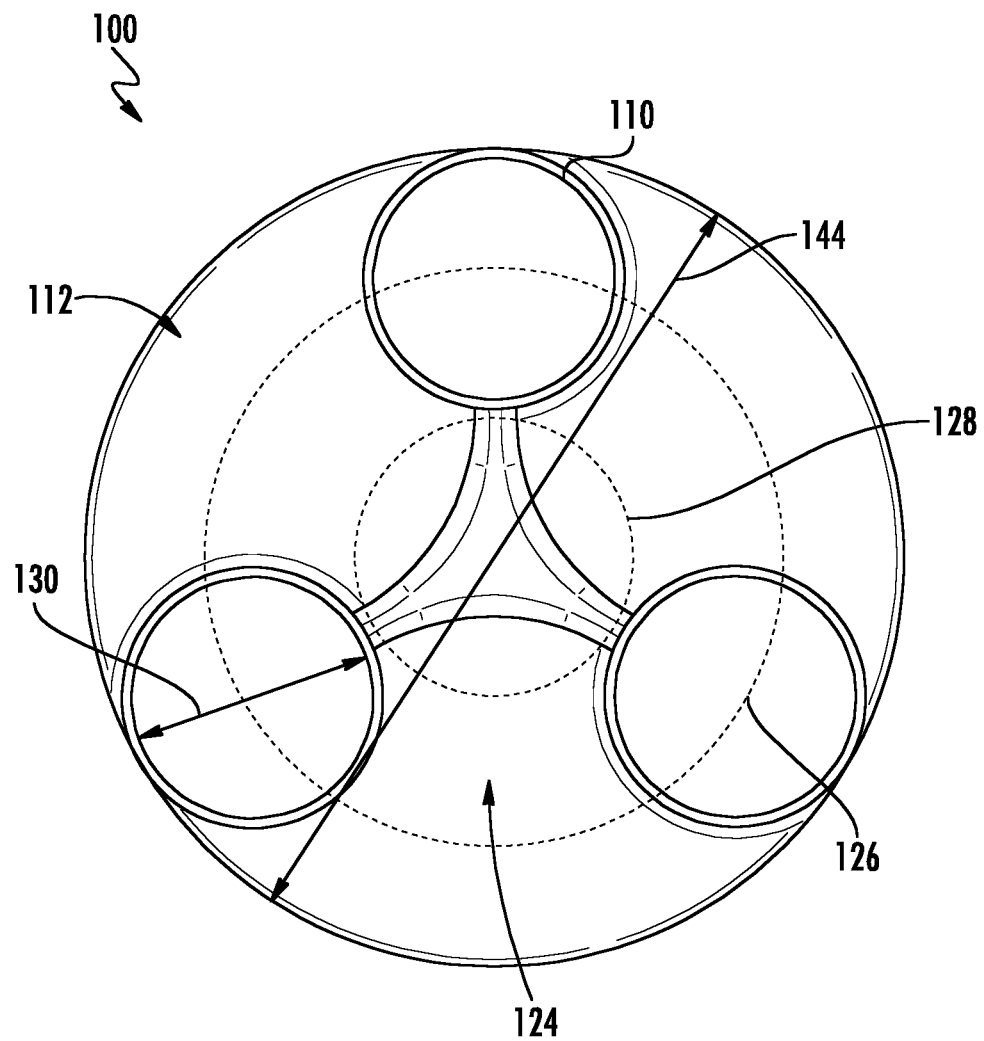
FIG. 4 provides a cross-sectional view of the exemplary heat exchanger of FIG. 2, taken along Line 4-4 of FIG. 3.

Referring now to FIGS. 2 through 4, an additively manufactured heat exchanger 100 according to an exemplary embodiment of the present subject matter is provided. More specifically, FIGS. 2 through 4 provide a perspective view, a side view, and a cross sectional view, respectively, of heat exchanger 100. As illustrated, heat exchanger 100 generally defines a longitudinal direction or centerline C and a radial direction R which is perpendicular to centerline C. According to the illustrated embodiment, heat exchanger 100 and centerline C are substantially straight. However, it should be appreciated that using the additive manufacturing processes and methods described herein, heat exchanger 100 could instead be curvilinear, serpentine, helical, sinusoidal, or any other suitable shape. It should be appreciated, that as used herein, terms of approximation, such as "approximately," "substantially," or "about," refer to being within a ten percent margin of error.

As illustrated, heat exchanger 100 extends between an inlet 102 and an outlet 104 along the centerline C and is configured for receiving one or more heat exchange fluids for a heat exchange process. More specifically, heat exchanger 100 includes a plurality of heat exchange tubes 110 that extend between an inlet manifold 112 positioned proximate to and defining inlet 102 and an outlet manifold 114 positioned proximate to and defining outlet 104. A flow of heat exchange fluid may enter heat exchanger 100 through inlet manifold 112, pass through tubes 110 where a heat exchange process occurs, and pass out of heat exchanger 100 through outlet manifold 114.

The illustrated embodiments illustrate heat exchanger 100 as being configured to receive one heat exchange fluid within tubes 110 and another heat exchange fluid passing over or around tubes 110. However, it should be appreciated that according to alternative embodiments, heat exchanger 100 may be configured for receiving more than one heat exchange fluid. In this regard, for example, inlet manifold 112 may be fluidly coupled to more than one fluid supply and may be configured for selectively directing the heat exchange fluids from the fluid supplies to the desired tubes 110.

Each of the plurality of tubes 110 extends between a tube inlet 120 and a tube outlet 122 which are fluidly coupled to inlet manifold 112 and outlet manifold 114, respectively, as described in more detail below. As illustrated, tubes 110 are helically formed around centerline C to define interstitial voids 124 through which another heat exchange fluid may flow. In this regard, for example, tubes positioned at a primary diameter 126 (see, e.g., FIG. 4) around centerline C and are spaced apart to allow a heat exchange fluid to flow over and around tubes 110. In addition, tubes 110 may define a primary void 128 through which the second heat exchange fluid may flow. According to an exemplary embodiment, primary void 128 has a diameter equal to or greater than a tube diameter 130. Notably, the heat exchange fluid flowing within tubes 110 is in thermal communication with the heat exchange fluid passing over tubes 110 and through interstitial voids 124 to allow for thermal energy transfer between the two fluids.

As shown in FIGS. 2 through 4, one exemplary embodiment of heat exchanger 100 has three tubes 110 that are helically formed around centerline C and extend along the centerline C between their respective tube inlets 120 and tube outlets 122. In this manner, each tube 110 defines a tube length 134 measured along the centerline C between inlet manifold 112 and outlet manifold 114. Notably, due to the helical shape of tubes 110, each tube 110 also defines an effective length 136. As used herein, the "effective length" of a tube 110 is measured along a cross sectional midpoint of each tube 110 as that tube 110 extends between tube inlet 120 and tube outlet 122. So defined, the effective length 136 of a helically wound tube 110 is always greater than the tube length 134 of that tube 110.

The magnitude of the difference between the tube length 134 and the effective length 136 depends in part on the pitch of the tube 110. As used herein, the "pitch" of the helically-wound tubes 110 is intended to refer to the number of turns or revolutions around centerline C for a fixed length along centerline C. In this regard, for example, a tube 110 having a pitch of 0.5 makes half a turn, or passes 180 degrees about centerline C, for every inch of tube 110 measured along the centerline C. Alternatively, pitch may refer to any other suitable measure for an angle of spiralization wherein increased pitch corresponds to an increased effective length 136. According to an exemplary embodiment of the present subject matter, the pitch of tubes 110 can be between about 0.01 and 0.25. According to another exemplary embodiment, the pitch can be about 0.1 revolutions per inch, such that each tube makes a single turn every ten inches of tube 110.

According to the illustrated embodiment, tubes 110 all have the same pitch along their tube lengths 134 and are 120 degrees out of phase with each other. In this manner, interstitial voids 124 defined between tubes 110 are relatively uniformly spaced and allow for a uniform flow volume through heat exchanger 100 along the tube length 134 of tubes 110. However, it should be appreciated that any suitable pitch or pitches may be used each tube 110 according to alternative embodiments. For example, the pitch of each tube 110 may be uniform along a length of the respective tube 110 or may vary along a length of the tube 110.

According to an exemplary embodiment, each tube 110 defines a surface area over which a heat exchange fluid is in contact with and transfers thermal energy through tube 110. More specifically, each tube 110 defines an internal surface area that is equivalent to an internal diameter of that tube 110 multiplied by the effective length 136 of that tube 110. In this regard, for example, the internal surface area corresponds to the area in thermal contact with the hot side heat exchange fluid (e.g., the oil passing through tubes 110). In addition, each tube 110 defines an external surface area that is equivalent to an external diameter of that tube 110 multiplied by the effective length 136 of that tube 110. In this regard, for example, the external surface area corresponds to the area in thermal contact with the cold side heat exchange fluid (e.g., the cooling air passing over tubes 110 and through interstitial voids 124). As used herein, "total surface area" of tubes 110 may refer to a sum of the internal or external surface areas of all tubes 110, or may refer to an average of these two surface areas.

Tubes 110 further define a surface area ratio equivalent to the total surface area of tubes 110 over a surface area of a single tube having a length equivalent to tube length 134 and a diameter equivalent to primary diameter 126. In general the surface area ratio provides a measure of the improvement in surface area and heat exchanger efficiency that may be achieved using the helical tube array construction in the same space as a single tube heat exchanger (as used in the prior art). According to exemplary embodiments, the surface area ratio is between about 1.5 and 3. According to the illustrated embodiment, the surface area ratio is about 2. Therefore, as illustrated, heat exchanger 100 has a heat transfer surface area that is approximately twice that of a single tube having the same overall dimensions.

Tubes 110 may further define a pitch-to-diameter ratio. In general, increasing the pitch of tubes 110 increases the effective length 136 of the tubes and thus the surface area. However, increasing the pitch for a fixed primary diameter 126 also increases the total flow blockage through interstitial voids 124. Therefore, for given primary diameter 126, the pitch should be selected to balance the need for increased surface area against the flow restrictions resulting from increased blockage. In this regard, the pitch-to-diameter ratio is defined as the pitch of tubes 110 (or average pitch if the pitch varies) over primary diameter 126. According to exemplary embodiments, the pitch-to-diameter ratio is between about 2 and 10. According to the illustrated embodiment, the pitch-to-diameter ratio is between about 4 and 6, or about 5. Other ratios are possible and within the scope of the present subject matter.

According to exemplary embodiments of the present subject matter, the plurality of tubes 110 also defines an outer heat exchanger diameter 144 that is substantially constant along tube length 134 of tubes 110. In this manner, heat exchanger 100 can replace an existing single tube heat exchanger having the same diameter without requiring additional space or different mounting structures. Moreover, because heat exchanger 100 increases the heat transfer surface area relative to a single tube heat exchanger as discussed above, heat exchange efficiency may be improved without requiring additional space or costly modifications to turbofan 10. Similarly, heat exchanger 100 may be curved, e.g., to wrap around a circular portion of turbofan 10, or may be any other suitable size and shape for positioning within turbofan 10.

Although the pitch, size, spacing, and phase separation of tubes 110 are illustrated as being uniform among each of tubes 110 and along tube length 134 of heat exchanger 100, it should be appreciated that such parameters may vary along tube length 134 of heat exchanger 100. For example, the pitch of tubes 110 may be uniform or may vary along tube length 134 of tube 110. In addition, each tube 110 within an array of tubes 110 may have a similar or different size, spacing, etc. In addition, according to the illustrated embodiment, tubes 110 all have substantially the same cross-sectional areas. Moreover, the cross-sections of tubes 110 are all substantially circular. However, it should be appreciated that the cross-sectional area and the geometry of the cross section of tubes 110 may vary from tube to tube or even along the tube length 134 of a tube 110 depending on the application and the characteristics of the heat exchange fluid to be passed through each respective tube 110. Thus, for example, the size of tubes 110 may decrease and the pitch of tubes 110 may increase toward a midpoint along the length of heat exchanger 100, e.g., to allow for thermal expansion of heat exchanger 100 or allow for more flex or spring to heat exchanger 100. In addition, the size and pitch of tubes 110 may be adjusted to improve the modal response of heat exchanger 100.

According to the exemplary embodiment, tubes 110 are generally configured for receiving a first heat exchange fluid, e.g., from a first fluid supply and through inlet manifold 112, as described in more detail below. In addition, heat exchanger 100 is positioned within or configured for receiving a flow of second heat exchange fluid which passes through interstitial voids 124 such that it is in thermal communication with first heat exchanger fluid. In this manner, a flow of first fluid (e.g., a hot fluid such as oil) may pass through tubes 110 and a flow of second fluid (e.g., a cooling fluid such as air) may pass through interstitial voids 124 of heat exchanger 100. The two flows of heat exchange fluid are in thermal communication with each other for transferring heat between each other. For example, air flowing through bypass airflow passage 56 may pass through interstitial voids 124 to remove heat from the oil passing through tubes 110 before being ejected out of fan nozzle exhaust section 76.

According to one exemplary embodiment, the first heat exchange fluid is oil and the second heat exchange fluid is air. However, it should be appreciated that any suitable type and number of heat exchange fluids may be used. In this manner, the size and configuration of each of the plurality of tubes 110 as well as the overall flow volume and restriction of heat exchanger 100 may be selected to improve the flow of a fluid passing through the heat exchanger 100 and tubes 110. For example, tubes 110 may have a slightly larger cross sectional area for passing oil, while interstitial voids 124 may be smaller for passing air. However, it should be appreciated, that tubes 110 may have any suitable size and geometry for passing any heat exchange fluid. According to another exemplary embodiment, tubes 110 may be designed to pass a flow of heat exchange fluid within a specific speed range, e.g., such that the flow of heat exchange fluid has a Mach number between about 0.1 and 0.4.

In addition, heat exchanger 100 may be positioned and oriented in any suitable manner for achieving the desired heat transfer. For example, according to the illustrated embodiment, heat exchanger 100 is positioned within bypass airflow passage 56 such that centerline C is substantially perpendicular to the axial direction A of turbofan 10. In this manner, air flows through heat exchanger 100 in a direction substantially perpendicular to centerline C of heat exchanger 100, e.g., such that the two flows of heat exchange fluid are in a cross-flow configuration. However, it should be appreciated that according to alternative embodiments, heat exchanger 100 may be configured such that the first heat exchange fluid and second heat exchange fluid flow in a parallel arrangement or a counter flow arrangement to transfer heat between the two flows of fluid. Moreover, it should be appreciated that according to alternative embodiments tubes 110 may be separated into any suitable number of passageways for performing a heat transfer process between any suitable number of fluids.

The various portions of heat exchanger 100 may be constructed using any suitable material, in any suitable geometry, density, and thickness, as needed to provide necessary structural support to heat exchanger 100. For example, tubes 110 may be constructed from a substantially rigid thermally conductive material in order to enhance heat transfer. In addition, according to exemplary embodiments, inlet manifold 112 and outlet manifold 114 may be thicker an denser to provide structural support for loads experienced by heat exchanger 100 during mounting, assembly, and operation of a gas turbine engine.

Notably, the helical construction of tubes 110 of heat exchanger 100 can allow heat exchanger 100 to flex along the centerline C and/or radial direction R. For example, in response to flow induced stresses or thermally induced stresses (e.g., as heat exchanger 100 material expands or contracts with temperature), tubes 110 of heat exchanger 100 may deflect in a manner similar to a spring. In this regard, for example, the pitch of tubes 110 may adjust slightly and the diameter of heat exchanger 100 may increase or decrease slightly to absorb such stresses.

Figure 10:
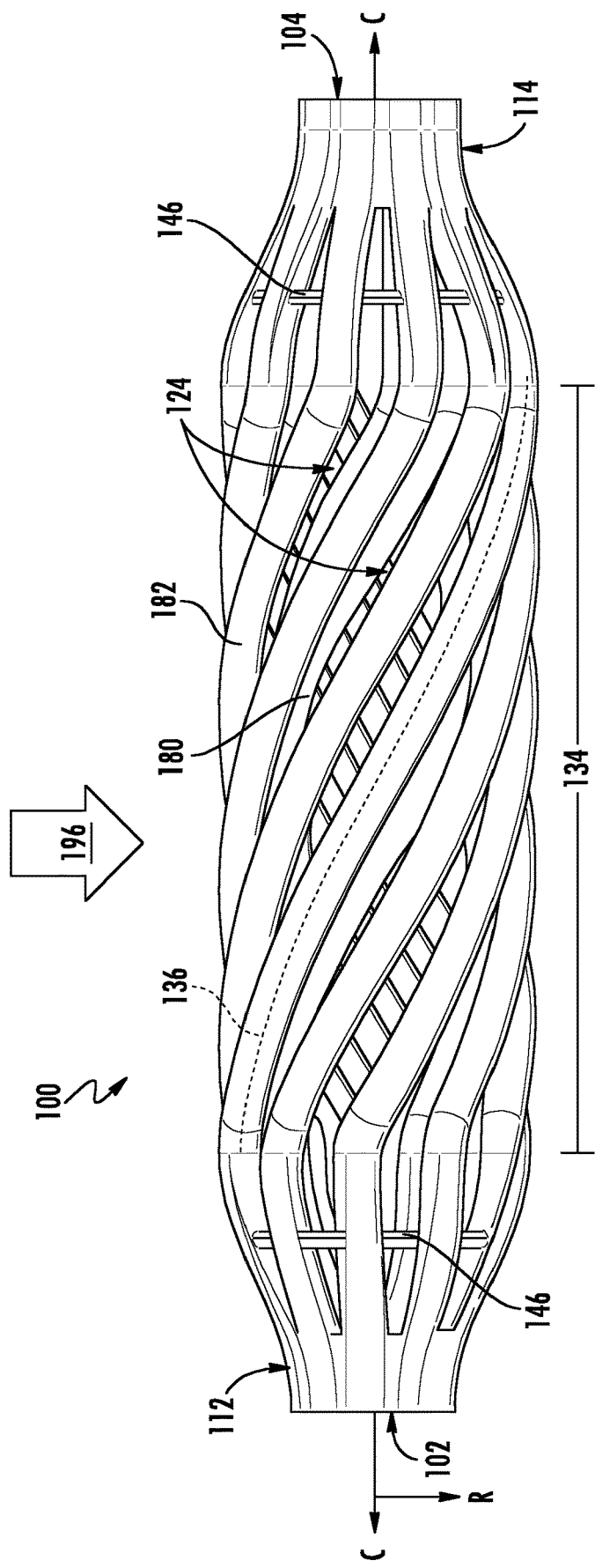
FIG. 10 provides a perspective view of an additively manufactured heat exchanger including stiffening structures that may be used in the exemplary gas turbine engine of FIG. 1 according to another exemplary embodiment of the present subject matter.
Figure 11:
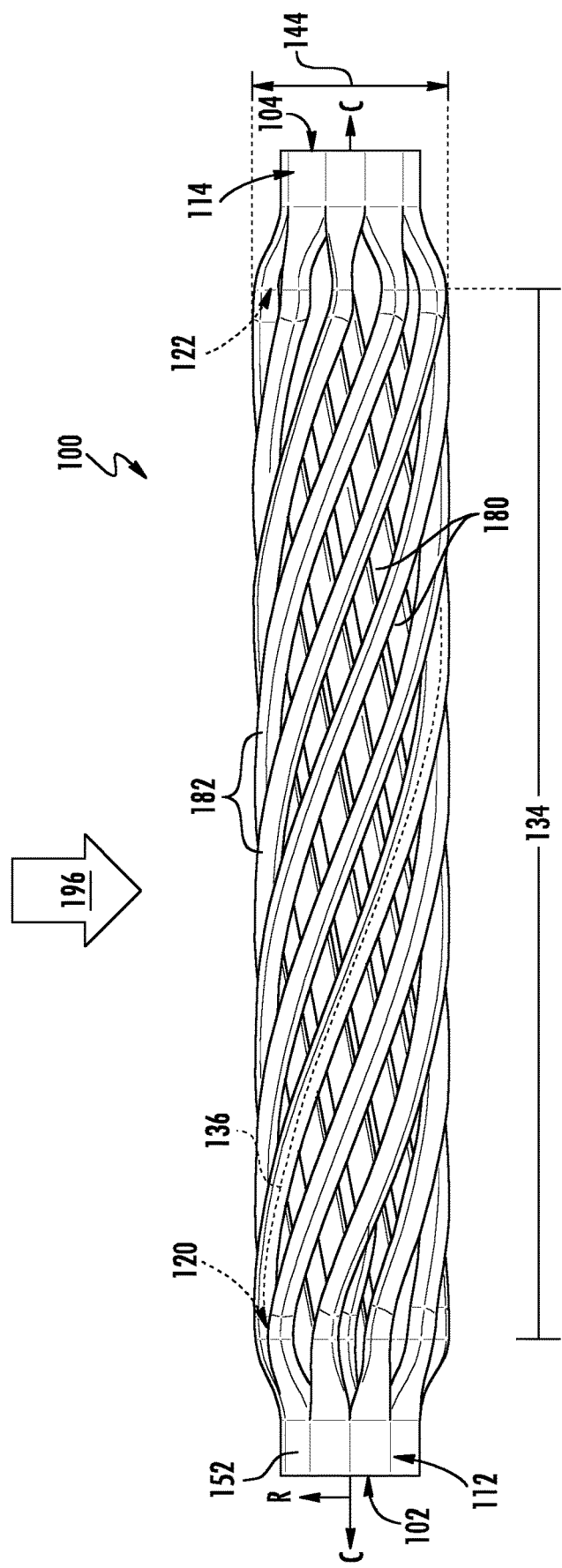
FIG. 11 provides a perspective view of an additively manufactured heat exchanger that may be used in the exemplary gas turbine engine of FIG. 1 according to another exemplary embodiment of the present subject matter.

According to one exemplary embodiment, heat exchanger 100 may have one or more stiffening structures 146 selectively positioned at any suitable location for adding rigidity to heat exchanger 100. For example, stiffening structures 146 may be ribs extending slightly along a length of tubes 110 proximate tube inlets 120 to provide rigidity proximate inlet manifold 112. Alternatively, as shown for example in FIG. 10, stiffening structures 146 may be stiffening struts that extends between adjacent tubes 110 to provide extra stiffness in a particular location. Stiffening structures 146 as described herein are only exemplary and are not intended to be limiting, nor are they required according to exemplary embodiments of the present subject matter.

In addition, heat exchanger 100 may include a plurality of flow turbulators (not shown), e.g., for increasing the heat transfer between the various heat exchange fluid passing through or over heat exchanger 100. As used herein, a "flow turbulator" may be any feature or structure positioned within a fluid passageway and configured for disturbing, agitating, or otherwise affecting the flow of fluid within that passageway. For example, in heat exchangers such as heat exchanger 100, the flow turbulators may be used to increase the Reynold's number of a flow of heat exchange fluid, e.g., to generate a turbulent flow that increases the heat transfer efficiency between two fluids in thermal contact. According to one exemplary embodiment, tubes 110 may define one or more flow turbulators on an internal or external surface, e.g., to improve heat transfer between the various heat exchange fluids.

Referring still to FIGS. 2 through 4, inlet manifold 112 and outlet manifold 114 will be described in more detail. Although the focus of the discussion will be related to inlet manifold 112, it should be appreciated that outlet manifold 114 may be formed in a manner similar to inlet manifold 112. In this regard, for example, the only difference between inlet manifold 112 and outlet manifold 114 is that inlet manifold 112 is configured for splitting a flow of heat exchange fluid while outlet manifold 114 is configured for merging multiple flows of heat exchange fluid. More specifically, for example, inlet manifold 112 provides fluid communication between inlet 102 of heat exchanger 100 and tube inlets 120, while outlet manifold 114 provides fluid communication between tube outlets 122 and outlet 104 of heat exchanger 100. In addition, the embodiment of inlet manifold 112 described herein is only one exemplary construction and is not intended to limit the scope of the present subject matter.

As illustrated, inlet manifold 112 generally includes an inner wall 150 and an outer wall 152 which together define an inlet plenum 154. One or more baffles 156 are positioned within inlet plenum 154 to divide inlet plenum 154 into a plurality of fluid passageways 158. For example, according to the illustrated embodiment, three baffles 156 extend from inner wall 150 (which according to the illustrated embodiment is simply the junction of baffles 156) substantially along the radial direction R to outer wall 152. In this manner, inlet plenum 154 is divided into three fluid passageways 158. Notably, according to the illustrated embodiment, each of the three fluid passageways 158 extends between inlet plenum 154 and a respective one of tube inlets 120.

Each of the plurality of fluid passageways 158 may have any suitable size and geometry to improve the division of a flow of heat exchange fluid entering inlet 102 of heat exchanger 100. In this regard, for example, each fluid passageway 158 is defined at least in part by inner wall 150, outer wall 152, and two baffles 156. These parts may be additively manufactured as one integral and monolithic piece having, e.g., an aerodynamic contour to reduce drag on a flow of heat exchange fluid in a manner not possible using prior manufacturing methods. For example, according to one embodiment, each fluid passageway 158 has a non-circular cross-section proximate inlet 102 of heat exchanger 100 and transitions into a circular cross-section proximate the respective tube inlet 120. According to alternative embodiments, each fluid passageways 158 defines an identical cross sectional area at every cross sectional plane taken perpendicular to centerline C.

As best shown in FIG. 4, heat exchanger 100 includes three tubes 110 that are helically formed at primary diameter 126 around centerline C. More specifically, a center of each tube 110 is positioned at primary diameter 126 relative to centerline C. However, it should be appreciated that according to alternative embodiments, heat exchanger 100 may have any suitable number of tubes positioned at any suitable radial position. For example, referring now specifically to FIGS. 5 through 11, heat exchanger 100 according to another exemplary embodiment will be described. Due to the similarity of the heat exchanger configurations described herein, like reference numerals will be used to refer to the same or similar features.

Figure 9:
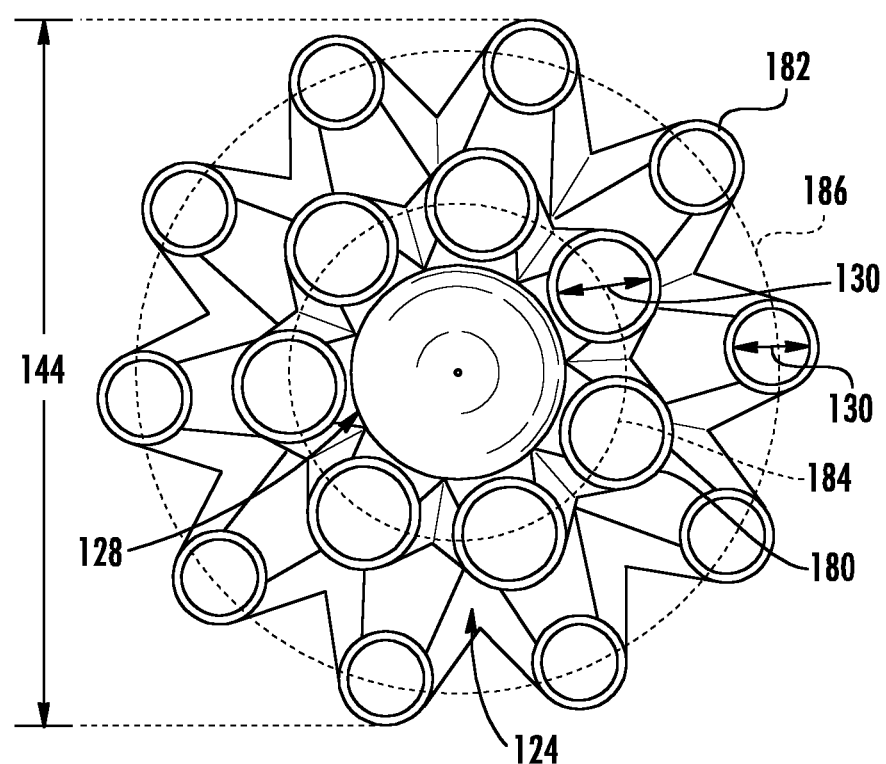
FIG. 9 provides a cross-sectional view of the exemplary heat exchanger of FIG. 5, taken along Line 9-9 of FIG. 6.

As illustrated, tubes 110 include a first plurality of tubes, e.g., inner tubes 180 and a second plurality of tubes, e.g., outer tubes 182. As best illustrated in FIG. 9, inner tubes 180 are positioned at a first diameter 184 around centerline C and outer tubes 182 are positioned at a second diameter 186 around centerline C. According to the illustrated exemplary embodiment, first diameter 184 and second diameter 186 are different from each other. In this manner, two distinct groups of tubes 110 are defined that may have different sizes, shapes, and configurations.

For example, according to the illustrated embodiment, inner tubes 180 have a lower pitch than outer tubes 182. According to one exemplary embodiment, inner tubes 180 have a pitch that is approximately half that of a pitch of outer tubes 182. Moreover, according to an alternative embodiment illustrated in FIG. 11, inner tubes 180 and outer tubes 182 are helically wound around centerline C along opposite circumferential directions. Although the illustrated embodiment shows seven inner tubes 180 and ten outer tubes 182 having substantially the same cross sectional area, it should be appreciated that the additive manufacturing methods described herein enable the formation of tubes having any suitable size, shape, cross sectional geometry, and configuration desired for a particular heat exchanger application.

Figure 5:
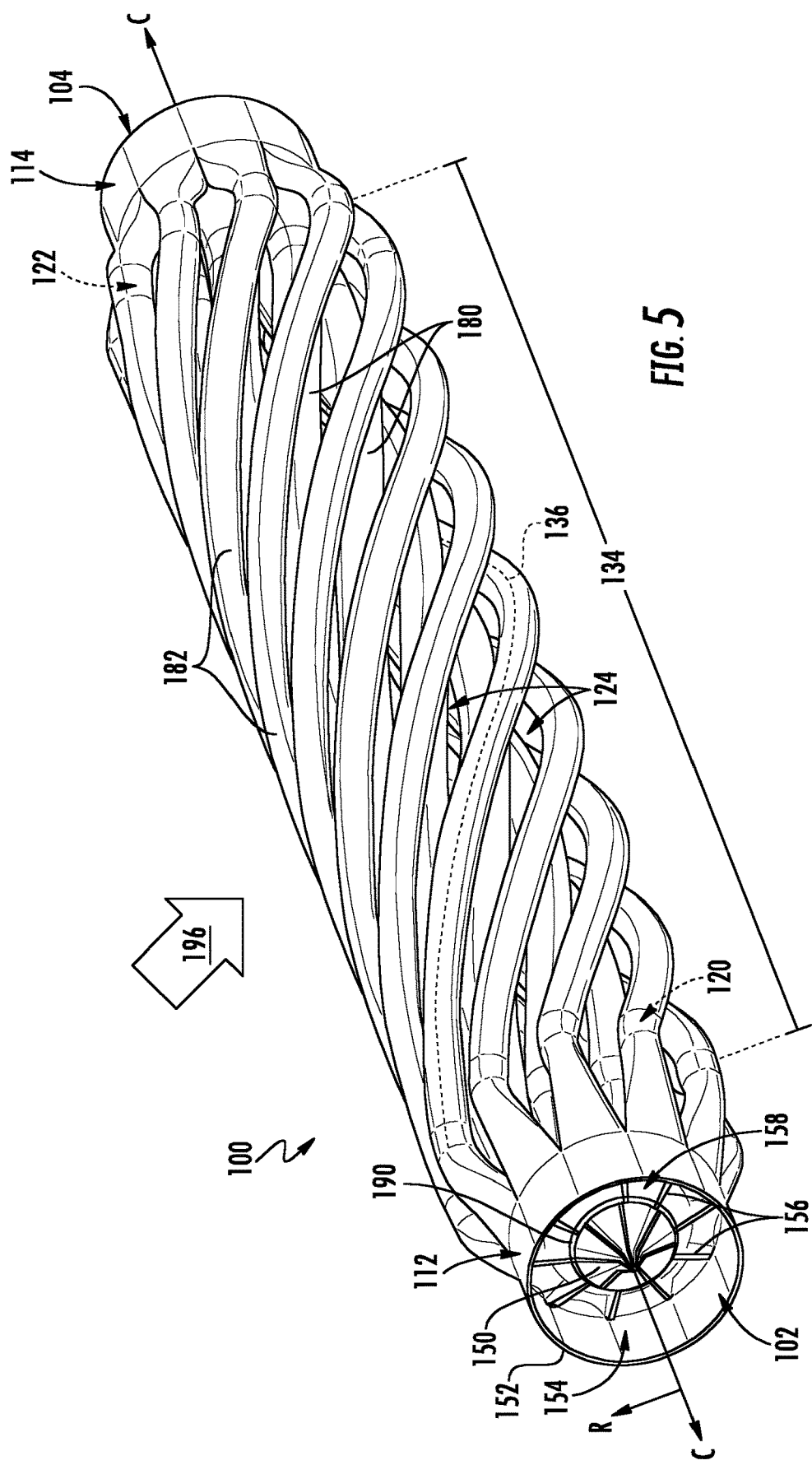
FIG. 5 provides a perspective view of an additively manufactured heat exchanger that may be used in the exemplary gas turbine engine of FIG. 1 according to another exemplary embodiment of the present subject matter.
Figure 6:
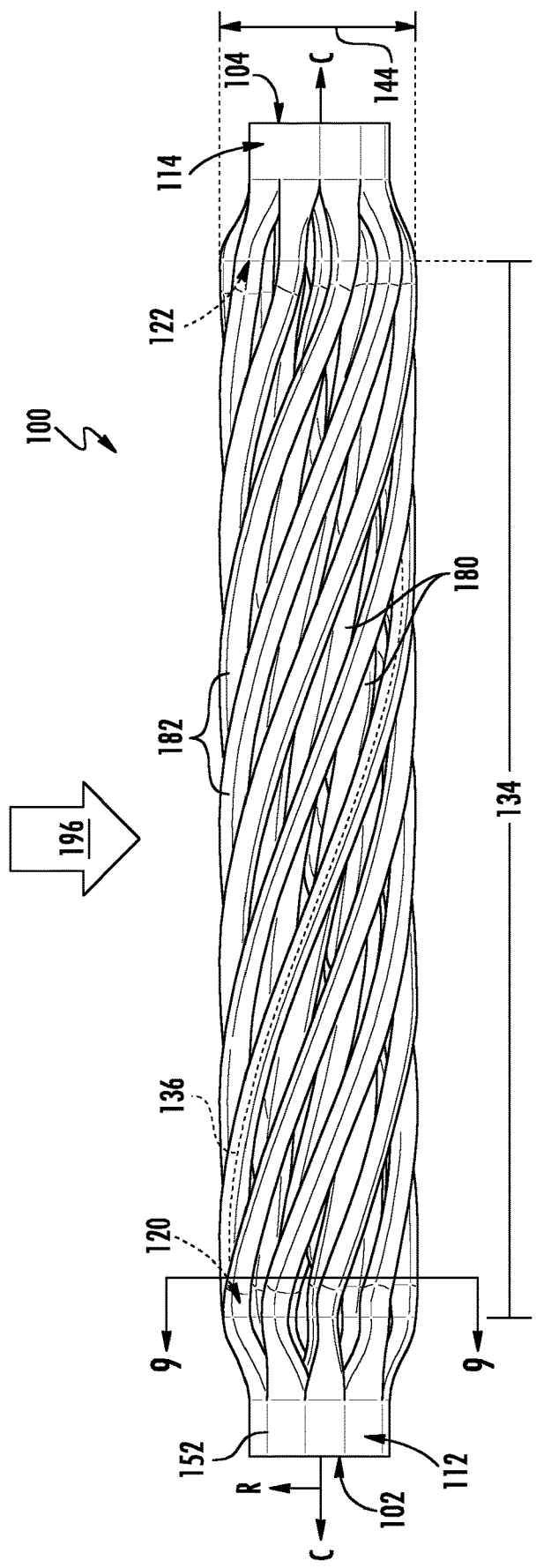
FIG. 6 provides a side view of the exemplary heat exchanger of FIG. 5.
Figure 7:
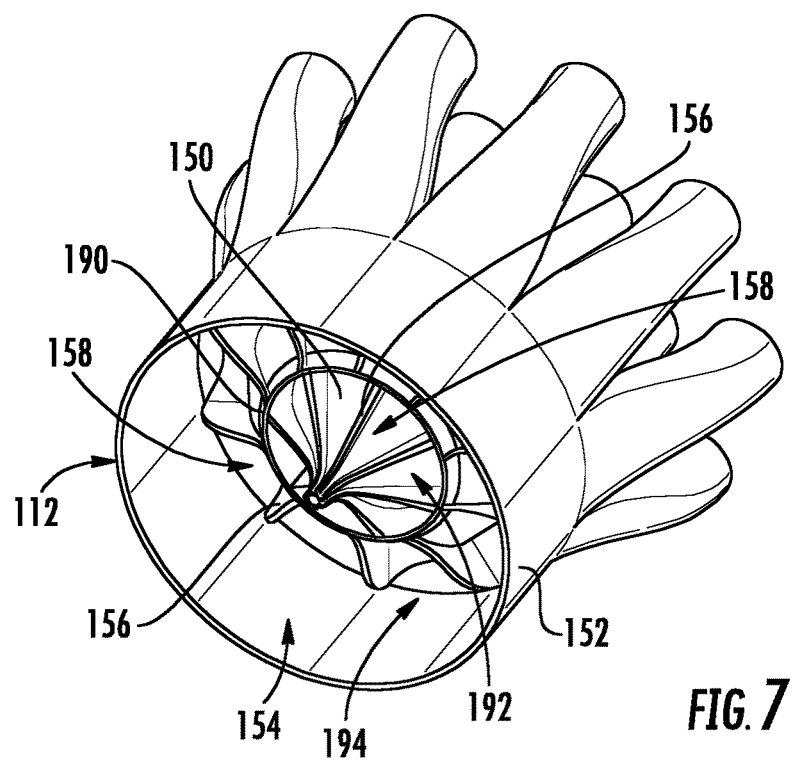
FIG. 7 provides a close-up, perspective view of an inlet manifold of the exemplary heat exchanger of FIG. 5 according to an exemplary embodiment of the present subject matter.
Figure 8:
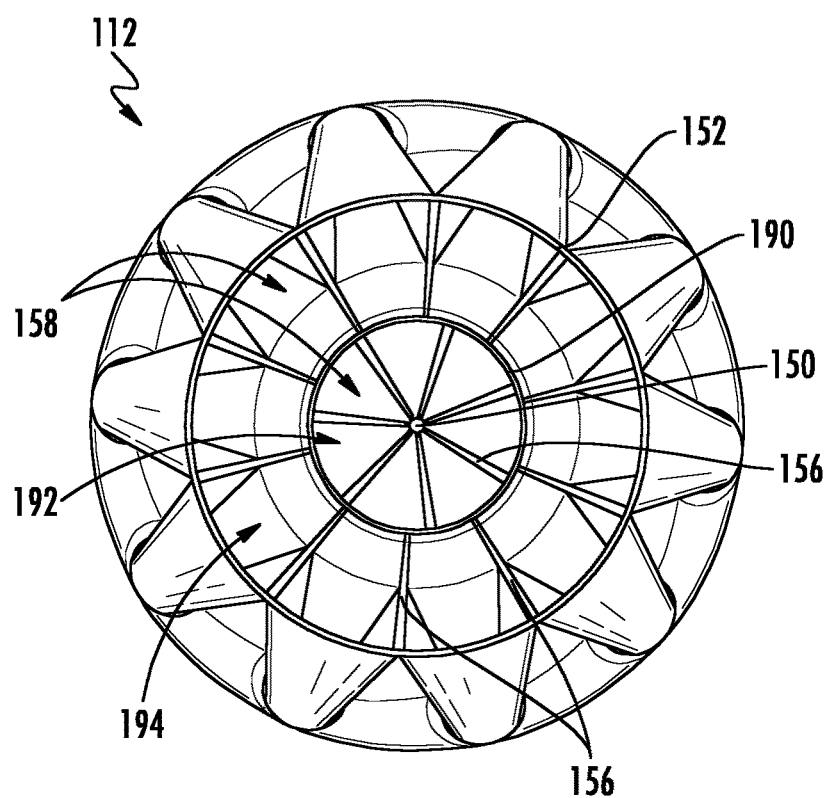
FIG. 8 provides a close-up, end view of the exemplary inlet manifold of FIG. 7.

Notably inlet manifold 112 has a slightly different configuration in order to split a flow of heat exchange fluid into inner tubes 180 and outer tubes 182. As best illustrated in FIGS. 5, 7, and 8, inlet manifold 112 may further define an intermediate wall 190 positioned between inner wall 150 and outer wall 152 along the radial direction R. In this manner, intermediate wall 190 divides inlet plenum 154 into an inner plenum 192 and an outer plenum 194. Similar to the construction of inlet manifold 112 described above with respect to FIGS. 2 through 4, a plurality of baffles 156 are positioned within inner plenum 192 and outer plenum 194 to divide them into fluid passageways 158 in a manner similar to that described above. For example, according to the illustrated embodiment, seven inner baffles 154 divide inner plenum 192 into seven inner fluid passageways 158 and ten outer baffles 154 divide outer plenum 194 into ten outer fluid passageways 158. It should be appreciated that other configurations are possible and within the scope of the present subject matter. For example, inlet manifold 112 and outlet manifold 114 may include up to 100 inner and outer baffles 154 according to one embodiment.

During operation, a flow of first heat exchange fluid, e.g., hot oil, enters heat exchanger 100 through inlet 102, e.g., flowing along centerline C. The oil flows into inlet plenum 154 where it is divided and directed into one or more fluid passageways 158 defined, e.g., by baffles 156 and walls 150, 152, and 190. The flow of oil is directed through the plurality of tubes 110 and converges in outlet manifold 114 before passing through outlet 104 of heat exchanger 100, e.g., flowing along centerline C. Simultaneously, a flow of second heat exchange fluid (as indicated by arrows 196), e.g., cool air, flows over tubes 110 and through interstitial voids 124 and is in thermal communication with the flow of hot oil. In this manner, thermal energy is transferred from the flow of hot oil to the flow of cooling air to reduce the oil temperature for improved performance.

It should be appreciated that heat exchanger 100 is described herein only for the purpose of explaining aspects of the present subject matter. For example, heat exchanger 100 will be used herein to describe exemplary configurations, constructions, and methods of manufacturing heat exchanger 100. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used by a manufacturer to form heat exchanger 100, or any other suitable heat exchanger. It should be appreciated that the exemplary method 200 is discussed herein only to describe exemplary aspects of the present subject matter, and is not intended to be limiting.

Figure 12:
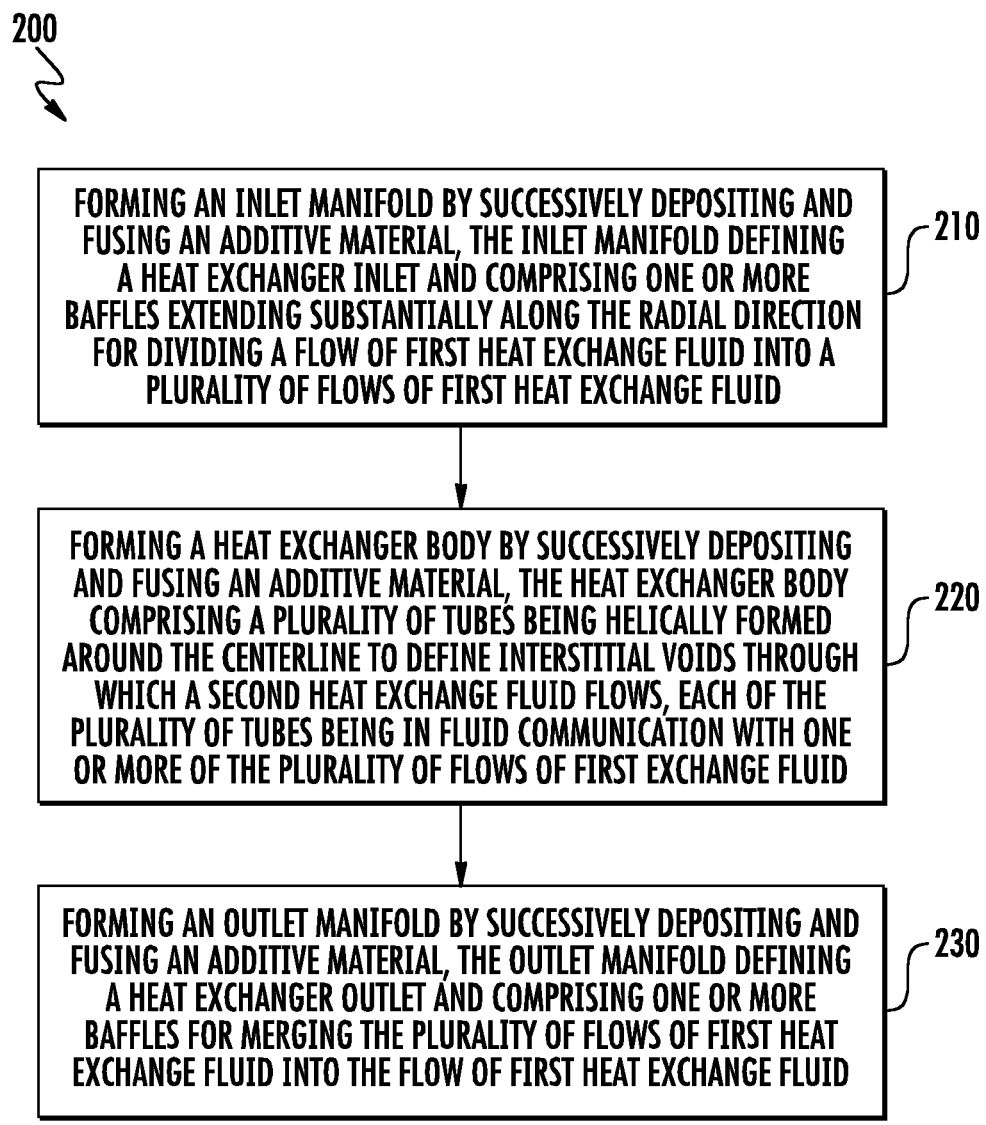
FIG. 12 is a method for forming a heat exchanger according to an exemplary embodiment of the present subject matter.

Referring now to FIG. 12, method 200 includes, at step 210, forming an inlet manifold by successively depositing and fusing an additive material. Step 210 may be performed using any of the additive manufacturing process described herein. According to one embodiment, the inlet manifold defines a heat exchanger inlet and comprises one or more baffles for dividing a flow of first heat exchange fluid into a plurality of flows of first heat exchange fluid. For example, the inlet manifold may include an inner wall and an outer wall that define an inlet plenum. According to another embodiment, inlet manifold may further include an intermediate wall dividing the inlet plenum into an inner and outer plenum and baffles for dividing the inner and outer plenum into distinct fluid passageways.

Method 200 further includes, at step 220 forming a heat exchanger body by successively depositing and fusing an additive material. According to one exemplary embodiment, the heat exchanger body comprises a plurality of tubes being helically formed around the centerline to define interstitial voids through which a second heat exchange fluid flows, each of the plurality of tubes being in fluid communication with one or more of the plurality of flows of first heat exchange fluid. For example, each of the plurality of tubes may extend between a tube inlet and a tube outlet and each of the distinct fluid passageways in the inlet manifold may extend between the inlet plenum and a respective one of the tube inlets.

Step 230 includes forming an outlet manifold by successively depositing and fusing an additive material. According to one embodiment, the outlet manifold defines a heat exchanger outlet and comprising one or more baffles for merging the plurality of flows of first heat exchange fluid into the flow of first heat exchange fluid. Notably, using the methods described herein, the inlet manifold, the heat exchanger body, and the outlet manifold may be integrally formed as a single monolithic component.

FIG. 12 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using heat exchanger 100 as an example, it should be appreciated that these methods may be applied to manufacture any suitable heat exchanger.

An additively manufactured heat exchanger and a method for manufacturing that heat exchanger are described above. Notably, heat exchanger 100 may generally include performance-enhancing geometries and heat exchanging features whose practical implementations are facilitated by an additive manufacturing process, as described below. For example, using the additive manufacturing methods described herein, the heat exchanger may include helical tubes, integral inlet and outlet manifolds, integral turbulators that improve the heat transfer efficiency, e.g., by increasing the Reynolds number of the flows of heat exchange fluids. These features may be introduced during the design of the heat exchanger, such that they may be easily integrated into heat exchanger during the build process at little or no additional cost. Moreover, the entire heat exchanger, including the inlet manifold, outlet manifold, the baffles, the plurality of tubes, stiffening structures, flow turbulators, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger defining a centerline and a radial direction perpendicular to the centerline, the heat exchanger comprising:

a first plurality of tubes defining a first diameter around the centerline;

a second plurality of tubes defining a second diameter around the centerline;

an inlet manifold comprising an inner wall, an intermediate wall, and an outer wall spaced apart along the radial direction to define an inner annular plenum and an outer annular plenum, wherein the inner wall converges to a forward tip positioned upstream of a leading edge of the intermediate wall; and a plurality of baffles positioned within the inner annular plenum and the outer annular plenum, each of the plurality of baffles defining an extension axis being substantially aligned with the radial direction to divide the inner annular plenum into a plurality of inner fluid passageways fluidly coupled to the first plurality of tubes and the outer annular plenum into a plurality of outer fluid passageways fluidly coupled to the second plurality of tubes wherein the inner wall, the intermediate wall, and the outer wall each define a circular cross section at every cross sectional plane taken perpendicular to the centerline; and wherein each of the plurality of inner fluid passageways is defined entirely by the inner wall, the intermediate outer wall, and two of the plurality of baffles, and wherein each of the plurality of outer fluid passageways is defined entirely by the intermediate wall, the outer wall, and two of the plurality of baffles.

2. The heat exchanger of claim 1, wherein the plurality of inner fluid passageways have a substantially triangular and the plurality of outer fluid passageways have a substantially trapezoidal cross-section proximate an inlet of the heat exchanger and transition into a circular cross-section downstream of the inlet.

3. The heat exchanger of claim 1, wherein each of the plurality of inner fluid passageways and the plurality of outer fluid passageways defines an identical cross sectional area at every cross sectional plane taken perpendicular to the centerline.

4. The heat exchanger of claim 1, wherein
a radial gap is defined between the first plurality of tubes and the second plurality of tubes.

5. The heat exchanger of claim 1, wherein the first plurality of baffles comprises seven baffles defining seven inner fluid passageways and the second plurality of baffles comprises ten baffles defining ten outer fluid passageways.

6. The heat exchanger of claim 1, wherein the inlet manifold and the plurality of baffles are integrally formed as a single monolithic component.

7. The heat exchanger of claim 1, wherein each of the plurality of inner fluid passageways extends entirely between the inner wall and the intermediate wall along the radial direction and the plurality of inner fluid passageways are stacked adjacent each other along the circumferential direction, and wherein each of the plurality of outer fluid passageways extends entirely between the intermediate wall and the outer wall along the radial direction and the plurality of outer fluid passageways are stacked adjacent each other along the circumferential direction.

8. The heat exchanger of claim 1, wherein the intermediate wall diverges relative to the centerline downstream of the leading edge.

9. An inlet manifold defining a centerline and a radial direction perpendicular to the centerline, the inlet manifold comprising:

an inner wall that converges to a forward tip;

an intermediate wall spaced apart from the inner wall along the radial direction to define an inner annular plenum therebetween, the intermediate wall defining a leading edge, wherein the forward tip is positioned upstream of the leading edge;

a outer wall spaced apart from the intermediate wall along the radial direction to define an outer annular plenum therebetween;

a first plurality of baffles extending between the inner wall and the intermediate wall to divide the inner annular plenum into a plurality of inner fluid passageways, each of the plurality of inner fluid passageways extending between the inner annular plenum and a respective one of a first plurality of tubes; and a second plurality of baffles extending between the intermediate wall and the outer wall to divide the outer annular plenum into a plurality of outer fluid passageways, each of the plurality of outer fluid passageways extending between the outer annular plenum and a respective one of a second plurality of tubes, wherein each of the first plurality of baffles and the second plurality of baffles defines an extension axis being substantially aligned with the radial direction to divide the plenum into a plurality of fluid passageways wherein the inner wall, the intermediate wall, and the outer wall each define a circular cross section at every cross sectional plane taken perpendicular to the centerline; and wherein each of the plurality of inner fluid passageways is defined entirely by the inner wall, the intermediate outer wall, and two of the plurality of baffles, and wherein each of the plurality of outer fluid passageways is defined entirely by the intermediate wall, the outer wall, and two of the plurality of baffles.

10. The inlet manifold of claim 9, wherein the first plurality of tubes define a first diameter around a centerline and the second plurality of tubes define a second diameter around the centerline, wherein a radial gap is defined between the first plurality of tubes and the second plurality of tubes.

11. The inlet manifold of claim 9, wherein each of the plurality of inner fluid passageways is defined entirely by the inner wall, the intermediate wall, and two of the plurality of baffles, and wherein each of the plurality of outer fluid passageways is defined entirely by the intermediate wall, the outer wall, and two of the plurality of baffles.

12. The inlet manifold of claim 9, wherein each of the plurality of inner fluid passageways extends entirely between the inner wall and the intermediate wall along the radial direction and the plurality of inner fluid passageways are stacked adjacent each other along the circumferential direction, and wherein each of the plurality of outer fluid passageways extends entirely between the intermediate wall and the outer wall along the radial direction and the plurality of outer fluid passageways are stacked adjacent each other along the circumferential direction.

13. The inlet manifold of claim 9, wherein the intermediate wall diverges relative to the centerline downstream of the leading edge.

* * * * *